United States Patent Office

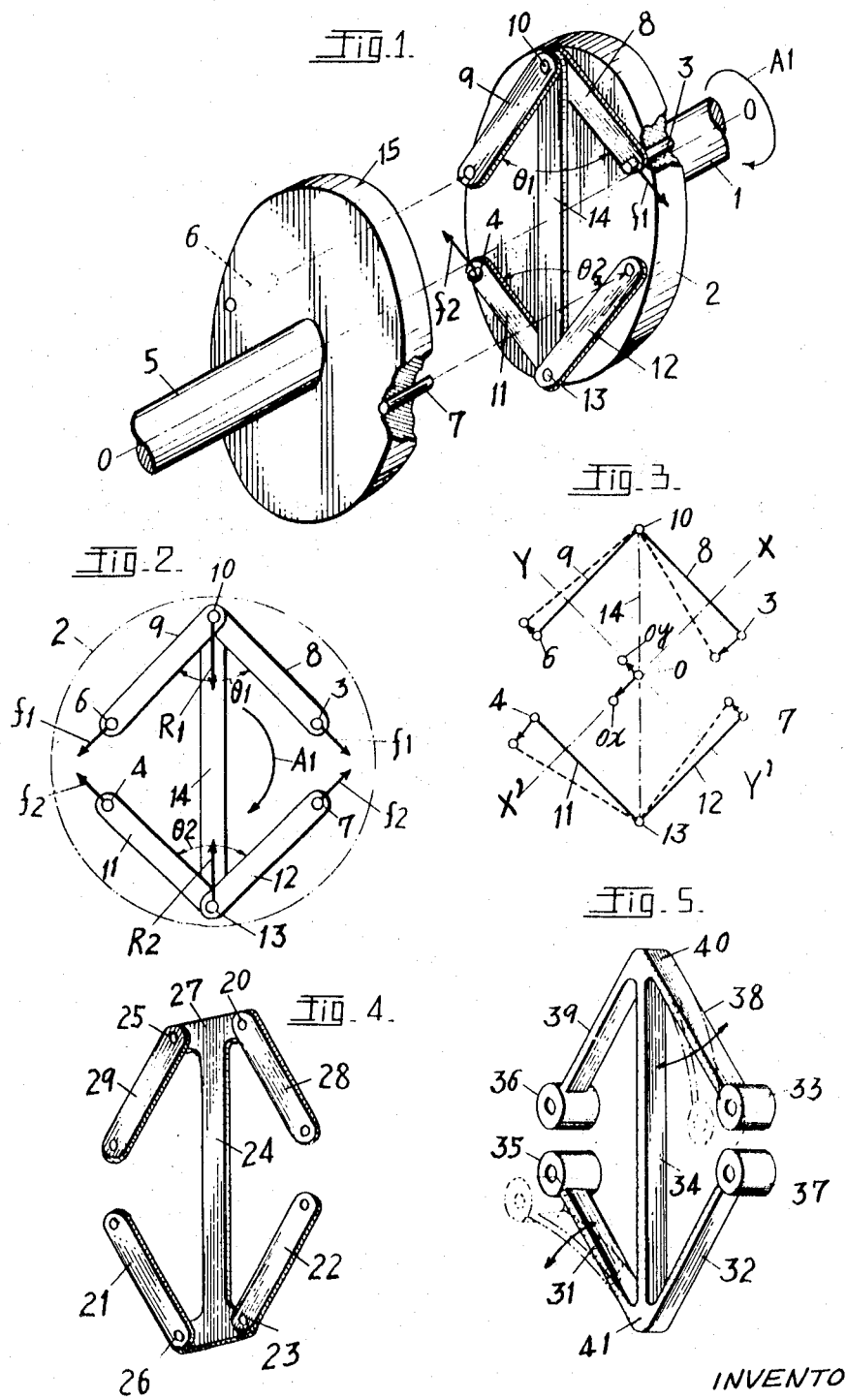

3,625,024
Patented Dec. 7, 1971

3,625,024
COUPLING
Takefusa Kikuchi, 6–18, 3-chome, Sakai, Musashino, Tokyo, Japan
Filed Feb. 26, 1970, Ser. No. 14,522
Claims priority, application Japan, May 29, 1969, 44/42,221
Int. Cl. F16d 3/62
U.S. Cl. 64—12                                     4 Claims

ABSTRACT OF THE DISCLOSURE

A coupling in which a driving flange and a driven flange located face-to-face are coupled by a link mechanism which comprises two V-shaped linkages, each linkage consisting of two bars and a cross bar bridging said V-shape linkages at their apices, one end of each V-shape linkage being pivotally secured to a pin projecting from the driving flange and the other end being pivotally secured to a pin projecting from the driven flange, whereby even when the driving shaft and driven shaft are axially misaligned, motive power is effectively transmitted from the former to the latter without any difficulty.

BACKGROUND OF THE INVENTION

This invention relates to an improved coupling for transmitting motive power from a driving shaft directly to a driven shaft.

Heretofore the conventional coupling of this kind comprised two flanges placed face-to-face at the adjacent ends of driving and driven shafts, these flanges being coupled by means of bolts passing therethrough.

Such a coupling suffers various problems in operation, if the driving shaft and driven shaft are not precisely aligned. In order to eliminate these problems, various couplings having elastic devices haev been developed. But in these conventional couplings, resisting forces induced in the deformed elastic members, due to the misaligned two axes, and due to the inaccuracy of workmanship, and even in case of properly aligned axes, act between two axes, and cause separate problems such as vibrations.

SUMMARY OF THE INVENTION

The device of this invention is featured in the construction which consists of a driving flange fixed at the end of a driving shaft, of a flange fixed at the end of a driven shaft and installed face-to-face with respect to the driving flange, the driving flange having a pair of driving pins and the driven flange a pair of driven pins, both of which are fixed symmetrically to the axes of shafts, of a pair of V-shape linkages, each consisting of a pair of links connected together by a pin at the apex of the V, while one end of each V-shape linkage is pivotally secured to the driving pin and another end to the driven pin, and of a cross bar connecting the linkages by pins at their apices.

The device of this invention is further featured by another construction, in which pins to connect said V-shape linkages and cross bar are eliminated to replace the link construction of coupling mechanism as above mentioned, by an integral construction made of elastic material, whose elastic arms are able to compensate swinging actions of links of link construction by their elastic bending.

One object of this invention is to provide a coupling which is able to transmit motive power from the driving shaft to driven shaft with no difficulties or problems even when said shafts are misaligned.

Other characteristics and advantages of this invention will be more apparent as description proceeds with reference to the accompanying drawings.

BRIEF DESCRIPTION OF THE DRAWINGS

FIG. 1 is a perspective view of a coupling of this invention, showing its disassembled status;

FIG. 2 is a vector diagram of forces acting in the coupling;

FIG. 3 is a diagrammatic illustration showing the action of the coupling;

FIG. 4 is another embodiment of the link mechanism of the present invention; and FIG. 5 is another embodiment showing an integral construction.

In FIG. 1, there is shown one embodiment of the coupling mechanism of this invention in which a driving shaft 1 has at its end a driving flange 2. A driven shaft 5 has a driven flange 15 arranged in opposite relation to said flange 2. The flange 2 has a pair of pins 3 and 4 fixed symmetrically to the shaft 1. The driven flange 15 has a pair of pins 6 and 7 fixed symmetrically to the shaft 5. A pair of links 8 and 9 are connected together at one of their ends by a pin 10 to form an angularly adjustable V-shape linkage, while at the other ends are joined respectively to the pins 3 and 6. Similarly, another pair of links 11 and 12 are connected together by a pin 13 to form another angularly adjustably V-shape linkage, and joined respectively to the pins 4 and 7. These linkages, whose concave sides of V being arranged to face with each other, are connected together by a bar 14 at each respectvie apex through pins 10 and 13.

As long as the opposite links 8 and 11, as well as the other opposite links 9 and 12, are parallel with each other, angular velocities of driving and driven axles 1 and 5 may be constant, even when the axles are eccentrically installed. In this case, swinging angles of links may be kept at a minimum, when the angle $\theta_1$ between links 8 and 9 and the angle $\theta_2$ between links 11 and 12 are 90°.

FIG. 2 is the vector diagram of forces acting in the coupling, with links 8, 9 and 11, 12 being symmetrically arranged to the cross bar 14, and the opposite links 8 and 11, as well as the links 9 and 12 being parallel with each other. Let $R_1$ be the vector sum of the force $f_1$ acting on the driving pin 3 and the force $f_1$ acting on the driven pin 6, and let $R_2$ be the vector sum of the force $f_2$ acting on the drive pin 4 and the force $f_2$ acting on the driven pin 7.

Then $R_1 = R_2$, therefore $f_1 = f_2$.

Thus it is clear that $f_1$ acting on the driving pin 3 and $f_2$ acting on the driving pin 4 are equal and parallel with each other in opposite directions. Therefore, only a pure torgue acts on the driving shaft. Similarly, $f_1$ acting on the driven pin 6 and $f_2$ acting on the driven pin 7 are equal and parallel with each other in opposite directions. This shows that only a pure torque acts on the driven shaft. Therefore, any shafting system equipped with a coupling of this invention can maintain a smooth running condition.

FIG. 3 is a diagrammatic illustration showing the action of the coupling, where the driving and driven axles are misaligned, the offset between two axles being small in comparison to the length of links.

In the drawing, solid lines show the position of each V-shape linkage and cross bar 14, when the axis of driving shaft 1 and that of driven shaft 5 are exactly aligned, and O represents the center of axes X and Y. Links 8 and 11 being pivotally connected respectively to the pins 10 and 13 at the apex of each V-shape linkage, and driving pins 3 and 4 are connected through driving flage 2, the axis O of the driving shaft may be shiftable with driving pins 3 and 4 without rotation to a position (for example point Ox) in the direction of line X–X' which is perpendicular to the links 8 and 11, and passes said point O. Also, hence links 9 and 12 are pivotally connected to the pins 10 and 13, and the driven pins 6 and 7 are fixed to the driven flange 15, the axis of said driven flange 15 may shift with driven pins 6 and 7 without rotation to a position (for example point Oy) in the direction of line Y–Y', which is perpendicular to the links 9 and 12, and passes the point O. Therefore, accommodation for smooth transmission may be effected for misalignment of shafts in any direction.

FIG. 4 shows another embodiment, wherein links 28 and 29 are pivoted to a cross bar 24, at its upper end, with pins 20 and 25 respectively, and links 21 and 22 are pivoted to the cross bar 24 at its lower end with pins 23 and 26 respectively.

FIG. 5 shows another embodiment of an integral construction of elastic material, consisting of a pair of arms 38 and 39, of another pair of arms 31 and 32, and of a cross bar 34, which corresponds respectively to said links 8, 9, 11, 12 and the cross bar 14 as shown in the FIG. 1. Thus some pins and pin joints are eliminated from the mechanisms, and still the elastic arms 38 and 39 as well as 31 and 32 of resilient material may be flexible in bendig direction as shown by dotted lines in FIG. 5. In this construction, 33 and 35 are bosses to receive pins 3 and 4 respectively, while 36 and 37 are bosses to receive pins 6 and 7 respectively, and 40 and 41 are the apices of the V-shape. The forces acting in the coupling of this embodiment behave similarly as show in FIG. 2 and FIG. 3 respectively.

Still further, it is noted that the whole coupling mechanism including flanges of this invention may be formed in an integral construction, that is, all of the driving flange, driven flange and coupling linkage includnig V-shape arms and cross bar are integrally formed.

The embodiments of the invention in which an enclusive property or privilege is claimed are defined as follows.

1. A coupling comprising a driving flange and a driven flange, each having on its face a pair of pins fixed symmetrically about its central axis, a pair of integrally connected V-shape linkages one end of each of said linkages pivotally secured to the pin on the driving flange and the other end to the pin on the driven flange; and a cross bar connecting said linkages at their apices, said cross bar and said linkages being integrally formed of resilient material.

2. The coupling defined in claim 1, wherein said V-shape linkages are located with the open portions of the V facing each other.

3. The coupling as defined in claim 1, wherein each said V-shape linkage comprises two straight leaf springs arranged in angular relation so that one is normal to the other.

4. The coupling as defined in claim 3, wherein said integrally connected V-shape linkages are flexible so as to bend between their points of attachment with said cross bar and said pins.

References Cited
UNITED STATES PATENTS

| | | | |
|---|---|---|---|
| 587,019 | 7/1897 | Sperry | 64—19 |
| 1,716,225 | 6/1929 | Georgevitch | 64—12 |

EDWARD G. FAVORS, Primary Examiner

U.S. Cl. X.R.

64—19